US012580178B2

(12) United States Patent
Chun et al.

(10) Patent No.: US 12,580,178 B2
(45) Date of Patent: Mar. 17, 2026

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Yu Gyeong Chun, Cheongju-si (KR); Moon Ho Choi, Cheongju-si (KR); Yoon Young Choi, Cheongju-si (KR); Jong Seung Shin, Cheongju-si (KR); Jin Won Lee, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 650 days.

(21) Appl. No.: 18/049,541

(22) Filed: Oct. 25, 2022

(65) Prior Publication Data

US 2023/0129261 A1 Apr. 27, 2023

(30) Foreign Application Priority Data

Oct. 26, 2021 (KR) ........................ 10-2021-0143301

(51) Int. Cl.
| | |
|---|---|
| *H01M 4/525* | (2010.01) |
| *H01M 4/36* | (2006.01) |
| *H01M 4/485* | (2010.01) |
| *H01M 4/505* | (2010.01) |
| *H01M 10/052* | (2010.01) |
| *H01M 4/02* | (2006.01) |

(52) U.S. Cl.
CPC ........... *H01M 4/364* (2013.01); *H01M 4/485* (2013.01); *H01M 4/505* (2013.01); *H01M 4/525* (2013.01); *H01M 10/052* (2013.01); *H01M 2004/021* (2013.01); *H01M 2004/028* (2013.01)

(58) Field of Classification Search
CPC ...... H01M 4/364; H01M 4/485; H01M 4/505; H01M 4/525; H01M 10/052; H01M 2004/021; H01M 2004/028
See application file for complete search history.

(56) References Cited

U.S. PATENT DOCUMENTS

| | | | |
|---|---|---|---|
| 2017/0092935 A1* | 3/2017 | Sun ........................ | C01G 53/50 |
| 2018/0145313 A1 | 5/2018 | Hwang et al. | |
| 2018/0241036 A1* | 8/2018 | Jo ........................... | C01G 53/50 |
| 2020/0266438 A1 | 8/2020 | Han et al. | |

FOREIGN PATENT DOCUMENTS

| | | |
|---|---|---|
| CN | 110957479 A | 4/2020 |
| EP | 3 734 720 A1 | 11/2020 |
| JP | 2018-536253 A | 12/2018 |
| KR | 10-2019-0093454 A | 8/2019 |

OTHER PUBLICATIONS

An Office Action; "Notice of Reasons for Refusal," mailed by the Japanese Patent Office on May 30, 2024, which corresponds to Japanese Patent Application No. 2022-171071 and is related to U.S. Appl. No. 18/049,541.

* cited by examiner

*Primary Examiner* — James Lee
(74) *Attorney, Agent, or Firm* — Studebaker Brackett PLLC

(57) ABSTRACT
The present invention relates to a positive electrode active material and a lithium secondary battery including the same, and more particularly, to a bimodal-type positive electrode active material including a first lithium composite oxide as a small particle and a second lithium composite oxide as a large particle, wherein the positive electrode active material may uniformly improve the particle stability of the small particle and the large particle by controlling a slope of a concentration gradient in which cobalt in the small particle and the large particle decreases from a surface portion toward a central portion, a positive electrode including the positive electrode active material, and a lithium secondary battery using the positive electrode.

13 Claims, No Drawings

POSITIVE ELECTRODE ACTIVE MATERIAL AND LITHIUM SECONDARY BATTERY INCLUDING THE SAME

CROSS-REFERENCE TO RELATED APPLICATION

This application claims priority to and the benefit of Korean Patent Application No. 10-2021-0143301, filed on Oct. 26, 2021, the disclosure of which is incorporated herein by reference in its entirety.

BACKGROUND

1. Field of the Invention

The present invention relates to a positive electrode active material and a lithium secondary battery including the same, and more particularly, to a positive electrode active material capable of uniformly improving the particle stability of a small particle and a large particle by controlling a slope of a concentration gradient in which cobalt in the small particle and the large particle decreases from a surface portion toward a central portion as a bimodal-type positive electrode active material including a first lithium composite oxide as the small particle and a second lithium composite oxide as the large particle, a positive electrode including the positive electrode active material, and a lithium secondary battery using the positive electrode.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charging/discharging efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharging capacity, due to cation mixing between Li and a transition metal, it is difficult to synthesize the $LiNiO_2$-based positive electrode active material, thereby causing a big problem in rate characteristics.

Meanwhile, the lithium composite oxide included in the positive electrode active material involves a volume change according to intercalation/deintercalation of lithium ions with respect to the lithium composite oxide during charging and discharging. Usually, the lithium composite oxide is in the form of secondary particles in which a plurality of primary particles are aggregated, and there is a problem in that a rapid change in volume of the primary particles occurs during charging and discharging, or cracks are generated in the secondary particles when a stress is accumulated due to repeated charge and discharge, or a collapse of the crystal structure or a change in crystal structure (phase transition) occurs.

Since this problem in turn acts as a cause of lowering the stability and reliability of the positive electrode active material, various studies have been made to mitigate the change in volume of the lithium composite oxide during charging and discharging, or to minimize the occurrence of stress due to the change in volume, thereby preventing damage to the particles.

In addition, recently, in order to increase the capacity of a lithium secondary battery, a bimodal-type positive electrode active material in which small particles and large particles having different average particle diameters are mixed has often been used. When the small particles and the large particles are mixed, the small particles having a relatively small average particle diameter can fill voids in the large particles, thereby improving the integration density of the lithium composite oxide in a unit volume and increasing the energy density per unit volume.

SUMMARY OF THE INVENTION

Conventionally, the stress due to the change in volume of primary particles was dispersed by intentionally lowering the degree of aggregation of the primary particles to prevent damage to the particles by mitigating the change in volume of the lithium composite oxide during charging and discharging or minimizing the occurrence of stress due to the changes in volume, so that there are predetermined voids between the primary particles. However, the lithium composite oxide has a limitation in that the energy density per unit volume is low.

Meanwhile, in the case of a bimodal-type positive electrode active material, small particles and large particles coated with a predetermined material may be used to relieve stress applied to the small particles and the large particles according to repeated charging and discharging.

In this case, when the mixture of small particles and large particles is mixed with the coating raw material and then heat treated at the same time, the coating imbalance problem between the small particles and the large particles may occur as the coating raw material is biased on the small particles having a relatively large specific surface area. This may act as a cause of degrading electrochemical properties and stability of the positive electrode active material as it causes an imbalance in particle stability between small particles and large particles in bimodal-type positive electrode active material.

In order to reduce the bias phenomenon of the coating described above, after mixing each of the small particles and the large particles with the coating raw material and performing heat treatment, mixing the coated small particles and large particles may be considered. However, in this case, it may be difficult to effectively fill the small particles in the large particle, and accordingly, a new problem may arise in that the integration density of the lithium composite oxide in the unit volume and the energy density per unit volume cannot be sufficiently improved.

Under these circumstances, the present inventors have found that the particle stability of each of small particle and large particle can be improved uniformly by controlling a slope of a concentration gradient in which cobalt in each of the small and large particles decreases from a surface portion toward a central portion.

Accordingly, an object of the present invention is to provide a bimodal-type positive electrode active material including a first lithium composite oxide as a small particle and a second lithium composite oxide as a large particle, wherein the first lithium composite oxide and the second lithium composite oxide include at least nickel and cobalt, and the cobalt in the first lithium composite oxide and the second lithium composite oxide has a concentration gradient that decreases from a surface portion toward a central portion, so that it is possible to improve the stability of the particles by mitigating or preventing the generation of cracks, a collapse of a crystal structure, and/or a change in crystal structure (phase transition) not only in the surface portions but also in the central portions of the first lithium composite oxide and the second lithium composite oxide.

In addition, an object of the present invention is to provide a bimodal-type positive electrode active material including a first lithium composite oxide as a small particle and a second lithium composite oxide as a large particle, wherein the first lithium composite oxide and the second lithium composite oxide include at least nickel and cobalt, and since the slope of the concentration gradient of the cobalt decreasing from a surface portion toward a central portion of the first lithium composite oxide is different from the slope of the concentration gradient of the cobalt decreasing from a surface portion toward a central portion of the second lithium composite oxide, the particle stability of the small particle and the large particle can be uniformly improved.

Further, another object of the present invention is to provide a positive electrode including the positive electrode active material as defined herein.

In addition, still another object of the present invention is to provide a lithium secondary battery using the positive electrode as defined herein.

According to one aspect of the present invention, there is provided a bimodal-type positive electrode active material including a first lithium composite oxide as a small particle and a second lithium composite oxide as a large particle.

Here, the first lithium composite oxide and the second lithium composite oxide include at least nickel and cobalt, and the cobalt in each of the first lithium composite oxide and the second lithium composite oxide may have a concentration gradient that decreases from a surface portion toward a central portion.

In this case, when $s1$ represents an absolute value of a slope of the concentration gradient of the cobalt decreasing from the surface portion toward the central portion of the first lithium composite oxide and $s2$ represents an absolute value of a slope of the concentration gradient of the cobalt decreasing from the surface portion toward the central portion of the second lithium composite oxide, $s1$ and $s2$ may satisfy the following Equation 1.

$$s1 < s2 \qquad \text{[Equation 1]}$$

The first lithium composite oxide and the second lithium composite oxide may be composite particles including at least one primary particle, and the primary particle may be represented by the following Chemical Formula 1.

$$Li_w Ni_{1-(x+y+z)} Co_x M1_y M2_z O_2 \qquad \text{[Chemical Formula 1]}$$

where M1 is at least one selected from Mn and Al,

M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W, and Cu, M1 and M2 are different from each other, $0.5 \leq w \leq 1.5$, $0 \leq x \leq 0.50$, $0 \leq y \leq 0.20$, and $0 \leq z \leq 0.20$.

In addition, at least one of the first lithium composite oxide and the second lithium composite oxide may be a core-shell particle including a coating layer covering at least a portion of a surface of the primary particle and a surface of the composite particle, and the coating layer may include a metal oxide represented by Chemical Formula 2.

$$Li_a M3_b O_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \leq a \leq 10$, $0 \leq b \leq 8$, and $2 \leq c \leq 13$, provided that a and b are not simultaneously 0.

In addition, according to another aspect of the present invention, there is provided a positive electrode including the positive electrode active material as defined herein.

In addition, according to still another aspect of the present invention, there is provided a lithium secondary battery using the positive electrode as defined herein.

A positive electrode active material according to various embodiments of the present invention is a bimodal-type positive electrode active material including a first lithium composite oxide as a small particle and a second lithium composite oxide as a large particle having average particle diameters different from each other, wherein the small particle having a relatively small average particle diameter can fill voids in the large particle, thereby improving the integration density of the lithium composite oxide in a unit volume and increasing the energy density per unit volume.

In addition, according to the present invention, the particle stability of small particle and large particle can be improved uniformly by controlling a slope of the concentration gradient in which cobalt in the small particle and the large particle decreases from a surface portion toward a central portion.

DETAILED DESCRIPTION OF EXEMPLARY EMBODIMENTS

Hereinafter, a positive electrode active material according to the present invention and a lithium secondary battery including the positive electrode active material will be described in more detail.

Positive Electrode Active Material

According to one aspect of the present invention, there is provided a bimodal-type positive electrode active material including a first lithium composite oxide as a small particle and a second lithium composite oxide as a large particle.

In the present application, the range of the average particle diameter (D50) of the small particles and the large particles is not particularly limited, but the following reference range of the average particle diameters (D50) of the small particles and the large particles can be determined to distinguish whether any lithium composite oxide is a small particle or a large particle.

The small particle is a lithium composite oxide having an average particle diameter (D50) of 7 μm or less, and the large particle is a lithium composite oxide having an average particle diameter (D50) greater than 7.0 μm. The upper limit of the average particle diameter (D50) of the large particle is not limited, but, for example, the large particle may have an average particle diameter greater than 7.0 and less than or equal to 30.0 μm.

In the bimodal-type positive electrode active material according to various embodiments of the present invention, the first lithium composite oxide and the second lithium composite oxide having the above-defined average particle diameter (D50) may be present in a mixed state at a weight ratio of 5:95 to 50:50.

In this case, the first lithium composite oxide may be present in a filled form in the voids in the second lithium composite oxide, may be attached to the surface of the second lithium composite oxide, or may also be present in a form in which the first lithium composite oxides are aggregated. However, it is preferable that the first lithium composite oxide having a relatively small average particle diameter in at least the plurality of voids formed by the second lithium composite oxide be present in a sufficiently filled state.

When the ratio of the first lithium composite oxide to the second lithium composite oxide in the positive electrode active material is excessively small, it may be difficult to sufficiently fill the first lithium composite oxide in the voids formed by the second lithium composite oxide. On the other hand, in the case where the ratio of the first lithium composite oxide to the second lithium composite oxide in the positive electrode active material is excessively large, the stability of the positive electrode active material may be lowered, for example, the press density of the positive electrode active material may be reduced as the aggregation ratio of the first lithium composite oxides in the positive electrode active material increases.

The first lithium composite oxide and the second lithium composite oxide include at least nickel and cobalt, and the cobalt in the first lithium composite oxide and the second lithium composite oxide may have a concentration gradient that decreases from a surface portion toward a central portion.

The first lithium composite oxide and the second lithium composite oxide may be composite particles including at least one primary particle, and the primary particle may be represented by the following Chemical Formula 1.

$$Li_wNi_{1-(x+y+z)}Co_xM1_yM2_zO_2 \quad \text{[Chemical Formula 1]}$$

where M1 is at least one selected from Mn and Al,
M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W, and Cu,
M1 and M2 are different from each other,
$0.5 \leq w \leq 1.5$, $0 \leq x \leq 0.50$, $0 \leq y \leq 0.20$, and $0 \leq z \leq 0.20$.

In addition, the first lithium composite oxide and/or the second lithium composite oxide may be a high-Ni type lithium composite oxide including primary particles in which concentrations (mol %) of Ni, Co, M1, and M2 in the above Chemical Formula 1 satisfies the following Relational Formula 1.

$$Ni/(Ni+Co+M1+M2) \geq 80.0. \quad \text{[Relational Formula 1]}$$

In addition, the first lithium composite oxide and/or the second lithium composite oxide may be a high-Ni/low-Co type lithium composite oxide including primary particles in which the concentrations (mol %) of Ni, Co, M1, and M2 in Chemical Formula 1 satisfies Relational Formula 1 and at the same time, the content of cobalt is 10 mol % or less, preferably 5 mol % or less.

In general, in a lithium composite oxide containing at least nickel and cobalt, it is known that as the content of nickel increases, structural instability of the lithium composite oxide may be caused by Li/Ni cation mixing. In addition, in the lithium composite oxide containing at least nickel and cobalt, it is reported that as the content of cobalt decreases, the initial overvoltage (resistance) increases, and accordingly, a decrease in rate characteristics is unavoidable.

However, the lithium composite oxide included in the positive electrode active material according to one embodiment of the present invention can have a concentration gradient in which the concentration of the cobalt from the surface portion of the lithium composite oxide toward the central portion thereof decreases, thereby mitigating and/or preventing the structural instability and deterioration in rate characteristics of the high-Ni type or high-Ni/low-Co type lithium composite oxide.

Meanwhile, the lithium composite oxide included in the positive electrode active material as defined herein may be a secondary particle including at least one primary particle.

Here, "a secondary particle including at least one primary particle" shall be interpreted to include both "a particle formed by aggregation of a plurality of primary particles" or "a particle in a non-aggregated form including a single primary particle."

The primary particle and the secondary particle may each independently have a rod shape, an oval shape, and/or an irregular shape.

When an average long axis length is used as an index indicating the sizes of the primary particle and the secondary particle, the average long axis length of the primary particle constituting the lithium composite oxide may be in the range of 0.1 μm to 5 μm, and the average long axis length of the secondary particle may be in the range of 1 μm to 30 μm. The average long axis length of the secondary particle may vary depending on the number of the primary particles constituting the secondary particle, and particles having various average long axis lengths may be included in the positive electrode active material.

When the lithium composite oxide is "a particle in a non-aggregated form including a single primary particle" or "a particle formed by aggregation of a relatively small number of primary particles," the size (average particle diameter) of the primary particles included in "the particle in the non-aggregated form including a single primary particle" or "the particle formed by aggregation of a relatively low number of primary particles" may be greater than the size (average particle diameter) of the primary particle included in "the secondary particle formed by aggregation of several tens to several hundreds or more of primary particles."

As such, the lithium composite oxide that is "a particle in a non-aggregated form including a single primary particle" or "a particle formed by aggregation of a relatively small number of primary particles" generally requires strong heat treatment conditions (high heat treatment temperature/long heat treatment) as compared to when producing "the secondary particle formed by aggregation of several tens to several hundreds or more of primary particles."

In general, it is known that, when heat treatment is performed at a relatively high temperature (for example, 800° C. or more) for a long time, particle growth (crystal growth) is promoted to obtain a positive electrode active material in which the size of a single particle is increased and the aggregation degree of the particles is lowered at the same time.

For example, when the lithium composite oxide is "a particle in a non-aggregated form including a single primary particle" or "a particle formed by aggregation of a relatively small number of primary particles," the average long axis length of the primary particles may be in the range of 0.5 μm to 20 μm. On the other hand, when the lithium composite oxide is "a particle formed by aggregation of a plurality of (tens to hundreds or more) primary particles," the average long axis length of the primary particles may be in the range of 0.1 μm to 5 μm.

In addition, the primary particle may include at least one crystallite. That is, the primary particle may be formed as a single crystallite or may be present as a particle including a plurality of crystallites.

In one embodiment, at least one of the first lithium composite oxide and the second lithium composite oxide is a core-shell particle including a coating layer covering at least a portion of a surface of the primary particle and a surface of the composite particle, and the coating layer may include a metal oxide represented by Chemical Formula 2 below.

$$Li_aM3_bO_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \leq a \leq 10$, $0 \leq b \leq 8$, and $2 \leq c \leq 13$, provided that a and b are not simultaneously 0.

In addition, the coating layer may be in a form in which different metal oxides are simultaneously present in one layer, or in which different metal oxides represented by Chemical Formula 2 are present in separate layers. In addition, the coating layer may include a metal oxide containing at least cobalt.

The metal oxide represented by Chemical Formula 2 may be physically and/or chemically bonded to the primary particle and/or the secondary particle. In addition, the metal oxide may be present in a state in which a solid solution is formed with the primary particle and/or the secondary particle.

The metal oxide is an oxide in which lithium and an element represented by M3 are complexed, or an oxide of M3, and the metal oxide is, for example, $Li_aW_bO_c$, $Li_aZr_bO_c$, $Li_aTi_bO_c$, $Li_aNi_bO_c$, $Li_aB_bO_c$, $Li_aCo_bO_c$, $Li_aAl_bO_c$, $Co_bO_c$, $Al_bO_c$, $W_bO_c$, $Zr_bO_c$, $Ti_bO_c$, or $B_bO_c$, but the above-described examples are merely described for convenience to facilitate understanding and the metal oxide defined herein is not limited to the above-described examples.

In addition, the metal oxide may be an oxide in which lithium and at least two elements represented by M3 are complexed, or may further include a metal oxide in which lithium and at least two elements represented by M3 are complexed. The metal oxide in which lithium and at least two elements represented by M3 are complexed may be, for example, $Li_a(W/Ti)_bO_c$, $Li_a(W/Zr)_bO_c$, $Li_a(W/Ti/Zr)_bO_c$, $Li_a(W/Ti/B)_bO_c$, etc., but is not necessarily limited thereto.

A concentration gradient pattern represented by cobalt in the first lithium composite oxide and the second lithium composite oxide included in the positive electrode active material according to the present application may be formed by the coating layer. That is, the concentration gradient exhibited by cobalt in the first lithium composite oxide and the second lithium composite oxide can be realized by the concentration of the cobalt present in the primary particle and/or secondary particle and the concentration of the cobalt in the metal oxide present on the surface of the primary particle and or secondary particle.

The concentration of the transition metal in the first lithium composite oxide and the second lithium composite oxide may be measured by various known methods. For example, after cross-sectioning each of the first lithium composite oxide and the second lithium composite oxide, the concentration of the target transition metal may be analyzed using a line scanning method through energy dispersive X-ray spectroscopy (EDS) mapping. In this case, a change in the concentration of the target transition metal in a direction from the surface portion of each of the first lithium composite oxide and the second lithium composite oxide toward the central portion thereof may be confirmed.

In addition, there is an energy profiling-energy dispersive X-ray spectroscopy (EP-EDS) method which measures the concentration of the target transition metal accumulated from the surface of each of the first lithium composite oxide and the second lithium composite oxide to a certain depth at which an electron beam penetrates for an acceleration voltage while changing the acceleration voltage ($V_{acc}$) of the electron beam radiated to the surface of each of the first lithium composite oxide and the second lithium composite oxide.

In the present application, the concentration of the transition metal was analyzed by the above-described EP-EDS method. Specifically, after selecting each of the first lithium composite oxide (small particle) and the second lithium composite oxide (large particle) included in the positive electrode active material according to the present application, the cumulative concentration (at %) of the transition metal from the surface of each of the first lithium composite oxide (small particle) and the second lithium composite oxide (large particle) to a certain depth to which the electron beam penetrates for the acceleration voltage can be analyzed while changing the acceleration voltage of the electron beam radiated to the surface of each of the selected first lithium mixed oxide (small particle) and the selected second lithium mixed oxide (large particle) from 1 kV to 30 kV (1 kV, 3 kV, 5 kV, 7.5 kV, 10 kV, 12.5 kV, 15 kV, 20 kV, and 30 kV).

For example, when it is possible to irradiate the surface of each of the first lithium composite oxide and the second lithium composite oxide with an electron beam at an acceleration voltage of 10 kV to penetrate the electron beam to a depth of about 300 nm from the surface of each of the first lithium composite oxide and the second lithium composite oxide, it possible to measure the concentration of the target transition metal present in a region of 300 nm in depth from the surfaces of each of the first lithium composite oxide and the second lithium composite oxide through the EP-EDS analysis. In addition, when it is possible to irradiate the surface of each of the first lithium composite oxide and the second lithium composite oxide with an electron beam at an acceleration voltage of 20 kV to penetrate the electron beam to a depth of about 800 nm from the surface of each of the first lithium composite oxide and the second lithium composite oxide, it possible to measure the concentration of the target transition metal present in a region of 800 nm in depth from the surfaces of each of the first lithium composite oxide and the second lithium composite oxide through the EP-EDS analysis.

That is, when the cumulative concentration of the target transition metal to be measured decreases as the acceleration voltage of the electron beam radiated to the surface of each of the first lithium composite oxide and the second lithium composite oxide increases, it can be interpreted as having a gradient in which the concentration of the target transition metal decreases from the surface portion toward the central portion of each of the first lithium composite oxide and the second lithium composite oxide.

In the EP-EDS analysis which measures a cumulative concentration of the cobalt from the surface of the secondary particle to a depth to which an electron beam penetrates using the electron beam radiated with an acceleration voltage increasing from 1 kV to 30 kV with respect to the surfaces of the first lithium composite oxide (small particle) and the second lithium composite oxide (large particle) included in the positive electrode active material according to the present application, both the first lithium composite oxide and the second lithium composite oxide can exhibit a concentration gradient in which the concentration of the cobalt decreases from the surface portion toward the central portion.

The concentration gradient in which the concentration of the cobalt decreases from the surface portion toward the central portion of each of the first lithium composite oxide and the second lithium composite oxide is present in the same way even when the first lithium composite oxide and the second lithium composite oxide are core-shell particles, and in this case, there may be a concentration gradient where the concentration of the cobalt decreases from the shell toward the cobalt.

In this case, the concentration gradient of the cobalt may be a concentration gradient in which the concentration of the cobalt continuously decreases or intermittently decreases from the surface portion toward the central portion of the particle. That is, when the concentration of cobalt at the end point compared to the start point of an arbitrary section for measuring the concentration of cobalt is decreased, the cobalt may be referred to as having a concentration gradient which decreases from the start point toward the end point.

However, in this case, the slope of the concentration gradient of the cobalt represented by each of the first lithium composite oxide and the second lithium composite oxide may be different from each other.

In this case, when $s1$ represents an absolute value of a slope of the concentration gradient of the cobalt decreasing from the surface portion toward the central portion of the first lithium composite oxide and $s2$ represents an absolute value of a slope of the concentration gradient of the cobalt decreasing from the surface portion toward the central portion of the second lithium composite oxide, it is preferable that $s1$ and $s2$ satisfy the following Equation 1.

$$s1 < s2 \qquad \text{[Equation 1]}$$

In addition, the slope of concentration gradient of the cobalt represented by each of the first lithium composite oxide and the second lithium composite oxide may be independent of each other, but since they have the same sign, the direction of the cobalt concentration gradient is the same.

Equation 1 means that the slope of the concentration gradient of the cobalt in the second lithium composite oxide, which is a large particle, is greater than the slope of the concentration gradient of the cobalt in the first lithium composite oxide, which is a small particle.

Here, a large slope of the concentration gradient means that the width at which the concentration of the cobalt decreases from the surface portion of the particle toward the central portion thereof is large. If the slope of the concentration gradient in which the concentration of the cobalt in the second lithium composite oxide decreases is large under the premise that the content of cobalt is the same in the first lithium composite oxide and the second lithium composite oxide, the cobalt in the second lithium composite oxide can be expected to be concentrated in the surface portion relative to the cobalt in the first lithium composite oxide.

However, when the content of cobalt in the second lithium composite oxide is greater than the content of cobalt in the first lithium composite oxide, the content of cobalt in the central portion of the second lithium composite oxide may be greater than or similar to the content of cobalt in the central portion in the first lithium composite oxide even though the slope of the concentration gradient in which the concentration of the cobalt in the secondary lithium composite oxide decreases is large.

For example, when the first lithium composite oxide (or a precursor thereof) and the second lithium composite oxide (or a precursor thereof) are mixed with a raw material of the metal oxide represented by Chemical Formula 2 and then subjected to heat treatment, instead of coating each of the first and second lithium composite oxides to form the core-shell particles, the coating raw material can be biased toward the first lithium composite oxide which is a small particle having a relatively large specific surface area and a small grain boundary density.

The coating layer formed on the surface of the lithium composite oxide described above serves to prevent damage to particles by alleviating the change in volume of the lithium composite oxide during charging and discharging, or minimizing the occurrence of stress due to the change in volume, but when the coating raw material is biased toward the first lithium mixed oxide, a variation in particle stability between the first and second lithium composite oxides is greater.

In addition, in the case of the first lithium composite oxide having a relatively small particle size and a small grain boundary density, since the formation of the coating layer on the inside of the secondary particle, i.e., the surface of the primary particle, is easier than with the second lithium composite oxide, when the coating raw material is biased toward the above-mentioned first lithium mixed oxide, a variation in the stability of primary particle in the surface portion and the central portion of the aforementioned second lithium composite oxide may occur.

Accordingly, it is preferable that the absolute value $s1$ of the slope of the concentration gradient of the cobalt decreasing from the surface portion of the first lithium composite oxide toward the central portion thereof and the absolute value $s2$ of the slope of the concentration gradient of the cobalt decreasing from the surface portion of the second lithium composite oxide toward the central portion thereof satisfy a predetermined relationship, so that the generation of cracks, the collapse of the crystal structure, and/or the change (phase transition) in crystal structure can be alleviated or prevented not only in the surface portion each of the first lithium composite oxide and the second lithium composite oxide but also in the central portion thereof to uniformly improve the stability of particles.

More specifically, $s1$ may be, but is not necessarily limited to, an absolute value of a slope of a concentration gradient of the cobalt measured in a region where an acceleration voltage of an electron beam radiated to the surface of the first lithium composite oxide is in the range of 1 kV to 30 kV, and $s2$ may be an absolute value of a slope of a concentration gradient of the cobalt measured in a region where an acceleration voltage of an electron beam radiated to the surface of the second lithium composite oxide is in the region of 1 kV to 30 kV, and the slope of the concentration gradient of the cobalt in each of the first and second lithium composite oxides may be an absolute value measured in a predetermined region in a direction from the surface portion (shell) toward the central portion (core) of each of the first lithium composite oxide and the second lithium compound oxide.

In one embodiment, $s1$, which is the absolute value of the slope of concentration gradient of the cobalt decreasing from the surface portion toward the central portion of the first lithium composite oxide, may satisfy the following Equation 2.

$$0.5 < s1 < 2.0 \qquad \text{[Equation 2]}$$

When s1, which is the absolute value of the slope of the concentration gradient of the cobalt in the first lithium composite oxide, is 0.5 or less, it means that there is almost no cobalt concentration deviation from the surface portion of the first lithium composite oxide toward the central portion thereof. In other words, this means that the amount of cobalt in the first lithium composite oxide is insufficient. In this case, the effect of improving the stability of the primary particles present in the surface portion of the first lithium composite oxide and the region relatively adjacent to the central portion of the first lithium composite oxide may be insufficient.

Meanwhile, the fact that s1, which is the absolute value of the slope of the concentration gradient of the cobalt in the first lithium composite oxide, is 2.0 or more may mean that the coating is biased toward the first lithium composite oxide and the coating for the second lithium composite oxide is insufficient. In this case, the effect of improving the stability of the primary particles present in the surface portion of the second lithium composite oxide and the region relatively adjacent to the central portion of the second lithium composite oxide may be insufficient.

In one embodiment, s2, which is the absolute value of the slope of the concentration gradient of the cobalt decreasing from the surface portion toward the central portion of the second lithium composite oxide, may satisfy the following Equation 3.

$$1.5 < s2 < 3.0 \qquad \text{[Equation 2]}$$

When s2, which is the absolute value of the slope of the concentration gradient of the cobalt in the second lithium composite oxide, is 1.5 or less, it means that the amount of cobalt within in second lithium composite oxide is insufficient. In this case, the effect of improving the stability of the primary particles present in the surface portion of the second lithium composite oxide and the region relatively adjacent to the central portion of the second lithium composite oxide may be insufficient.

Meanwhile, the fact that s2, which is the absolute value of the slope of the concentration gradient of the cobalt in the second lithium composite oxide, is 3.0 or more may mean that the coating is biased toward the second lithium composite oxide and the coating for the first lithium composite oxide is insufficient. In this case, although the average particle diameter and grain boundary density are smaller than those of the second lithium composite oxide, which is advantageous for coating, the absolute coating amount is insufficient, and thus the effect of improving the stability of the first lithium composite oxide may be insufficient.

Taking Equations 1 to 3 together, it is preferable that the cobalt in each of the first lithium composite oxide and the second lithium composite oxide have a concentration gradient decreasing from the surface portion toward the central portion, and that the absolute value of the slope of the concentration gradient of the cobalt decreasing from the surface portion toward the central portion of the first lithium composite oxide be controlled to be smaller than the absolute value of the slope of the concentration gradient of the cobalt decreasing from the surface portion toward the central portion of the second lithium composite oxide.

Additionally, the concentration of the cobalt in the second lithium composite oxide measured when the acceleration voltage is 1.0 kV in the EP-EDS analysis with respect to the surface of each of the first lithium composite oxide and the second lithium composite oxide may be greater than that in the first lithium composite oxide.

In this case, even if the absolute value of the slope of concentration gradient of the cobalt decreasing from the surface portion of the second lithium composite oxide toward the central portion thereof is greater than that of the first lithium composite oxide, a concentration of cobalt satisfying a predetermined criterion can be achieved even in the central portion of the second lithium composite oxide.

In addition, for the same reason as described above, the concentration of the cobalt in the second lithium composite oxide measured when the acceleration voltage is 30.0 kV in the EP-EDS analysis with respect to the surface of each of the first lithium composite oxide and the second lithium composite oxide may be greater than that in the first lithium composite oxide.

In one embodiment, s1, which is the absolute value of the slope of the concentration gradient of the cobalt decreasing from the surface portion toward the central portion of the first lithium composite oxide, and s2, which is the absolute value of the slope of the concentration gradient of the cobalt decreasing from the surface portion toward the central portion of the second lithium composite oxide, may satisfy the following Equation 4.

$$1.0 \leq s2/s1 \leq 3.0 \qquad \text{[Equation 4]}$$

The fact that s2/s1 calculated by Equation 4 is greater than 3.0 means that the coating for the first lithium composite oxide is insufficient because the coating is excessively biased toward the second lithium composite oxide rather than the first lithium composite oxide. In this case, although the average particle diameter and grain boundary density are smaller than those of the second lithium composite oxide, which is advantageous for coating, the absolute coating amount is insufficient, and thus the effect of improving the stability of the first lithium composite oxide may be insufficient. In addition, due to the coating deviation of the first lithium composite oxide and the second lithium composite oxide, there is a fear that the performance deterioration due to the stability deviation between the first lithium composite oxide and the second lithium composite oxide in the bimodal-type positive electrode active material may be accelerated.

Meanwhile, when s2/s1 calculated by Equation 4 is less than 1.0, it means that the amount of cobalt in the second lithium composite oxide is insufficient. In this case, the effect of improving the stability of the primary particles present in the surface portion of the second lithium composite oxide and the region relatively adjacent to the central portion of the second lithium composite oxide may be insufficient. Also, it is preferable that s2/s1 calculated by Equation 4 is 1.5 or more.

Also, as described above, the first lithium composite oxide and the second lithium composite oxide may be composite particles including at least one primary particle capable of intercalation/deintercalation of lithium. When a plurality of primary particles of the first lithium composite oxide and/or the second lithium composite oxide are included, the plurality of primary particles may be present as a secondary particle that is aggregates of each other.

A primary particle is one grain or crystallite, and a secondary particle is an aggregate formed by aggregation of a plurality of primary particles. A void and/or a grain boundary may be present between the primary particles constituting the secondary particle.

In this case, the first lithium composite oxide and the second lithium composite oxide in the bimodal-type positive electrode active material may have different degrees of aggregation of primary particles in different ranges.

The degree of aggregation of primary particles in the first lithium composite oxide and the second lithium composite oxide may be measured by the grain boundary density defined herein.

Specifically, the grain boundary density can be calculated by substituting the number of crystallites placed on a virtual straight line crossing the center of each of the first lithium composite oxide and the second lithium composite oxide in a minor axis direction and the number of interfaces between the crystallites in the following Equation 5 in a cross-sectional scanning electron microscope (SEM) image obtained by photographing the cross-section of each of the first lithium composite oxide and the second lithium composite oxide using an SEM after each of the first lithium composite oxide and the second lithium composite oxide is cross-sectioned.

$$\text{Grain boundary density} = (\text{number of interfaces between crystallites placed on the virtual straight line/number of crystallites placed on the virtual straight line}). \quad \text{[Equation 5]}$$

For example, in the case where the lithium composite oxide is a non-aggregated single particle composed of a single crystallite, the number of crystallites placed on the virtual straight line crossing the center of the lithium composite oxide in the cross-sectional SEM image of the lithium composite oxide is one, and thus there is no interface between crystallites, and the grain boundary density calculated according to Equation 1 is 0.

In addition, when the lithium composite oxide is a particle formed by aggregation of a relatively small number of primary particles, the number of crystallites (primary particles) placed on the virtual straight line crossing the center of the lithium composite oxide in the cross-sectional SEM image of the lithium composite oxide is two, and thus there is one interface between crystallites, and the grain boundary density calculated according to Equation 1 is 0.5.

In general, since the grain boundary density of the first lithium composite oxide, which is a small particle, is smaller than that of the second lithium composite oxide, the coating for the grain boundaries in the region adjacent to the central portion of the first lithium composite oxide compared to the second lithium composite oxide may be advantageous. In this case, the coating for the central portion as well as the surface portion of the first lithium composite oxide may be sufficiently performed with only a relatively small amount of coating raw material compared to the second lithium composite oxide.

Nevertheless, in the bimodal-type positive electrode active material including the second lithium composite oxide as a large particle and the first lithium composite oxide as a small particle, particle stability of the primary particles present in a region close to the central portion of the second lithium composite oxide may be relatively improved when it is possible to reduce the rate at which the coating is biased toward the first lithium composite oxide having a relatively small average particle diameter and grain boundary density. Lithium Secondary Battery Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it has conductivity without causing a chemical change in the battery, and for example, stainless steel; aluminum; nickel; titanium; calcined carbon; or aluminum or stainless steel surface-treated with carbon, nickel, titanium, silver, etc. may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

In this case, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used for imparting conductivity to an electrode, and may be used without particular limitation as long as it has electron conductivity without causing a chemical change in a battery to be formed. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the positive electrode current collector may be used in various forms such as a film, a sheet, a foil, a net, a porous body, a foam, a nonwoven body, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

In addition, in another embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film made of a polyolefin-based polymer such as an ethylene homopolymer, a propylene homopolymer, an ethylene/ butene copolymer, an ethylene/hexene copolymer, and an ethylene/methacrylate copolymer, or a laminated structure including two or more of these layers may be used. In addition, a conventional porous nonwoven fabric, for example, a nonwoven fabric made of high melting point glass fiber, polyethylene terephthalate fiber, etc. may be used. In addition, a coated separator including a ceramic component or a polymer material may be used to secure heat resistance or mechanical strength, and may optionally be used in a single-layer or multi-layer structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, $\gamma$-butyrolactone, or $\varepsilon$-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, or $LiN(CF_3SO_2)_2$. $LiCl$, $LiI$, or $LiB(C_2O_4)_2$ or the like may be used. The concentration of the lithium salt is preferably used within the range of 0.1 M to 2.0 M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharging capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. In this case, the additive(s) may be included at 0.1 to 5 wt % with respect to the total weight of the electrolyte.

Since the lithium secondary battery including the positive electrode active material according to the present invention stably exhibits excellent discharging capacity, excellent output characteristics and excellent lifespan characteristics, it is useful in portable devices such as a mobile phone, a notebook computer and a digital camera and an electric automobile field such as a hybrid electric vehicle (HEV).

The external shape of the lithium secondary battery of the present invention is not particularly limited, but may be a cylindrical type using a can, a prismatic type, a pouch type, or a coin type. In addition, the lithium secondary battery may be used in a battery cell that is not only used as a power source of a small device, but also preferably used as a unit battery for a medium-to-large battery module including a plurality of battery cells.

According to yet another embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in more detail through examples. However, these examples are merely provided to explain the present invention, and it will not be interpreted that the scope of the present invention is limited by the examples below.

Preparation Example 1. Preparation of Positive Electrode Active Material (1) Example 1

(a) A $NiCoAl(OH)_2$ hydroxide precursor (Ni:Co:Al=95: 4:1 (at %)) of a first lithium composite oxide as a small particle and a second lithium composite oxide as a large particle were synthesized through a known co-precipitation method using nickel sulfate, cobalt sulfate, and aluminum sulfate. The synthesized $NiCoAl(OH)_2$ hydroxide precursor was heated at 2° C. per minute to 400° C., and calcined at 400° C. for 6 hours to be converted to an oxide precursor.

The average particle diameter (D50) of the oxide precursor (first oxide precursor) of the first lithium composite oxide was 4.0 µm, and the average particle diameter (D50) of the oxide precursor (second oxide precursor) of the second lithium composite oxide was 18.0 µm.

(b) After weighing so that the weight ratio of the first oxide precursor and the second oxide precursor prepared in step (a) was 20:80, LiOH (Li/(Ni+Co+Al) molar ratio=1.05) was added and mixed, heated at 2° C. per minute to 800° C., and heat-treated for 12 hours while an $O_2$ atmosphere was maintained in a furnace to obtain an intermediate product.

(c) Distilled water was added to the intermediate product, a 7.0 wt % aqueous cobalt sulfate solution was added thereto such that the amount of the cobalt derived from the aqueous cobalt sulfate solution was 3.0 mol % relative to the metal element (Ni+Co+Al) aside from lithium in the intermediate product, and stirred at 300 rpm for 1 hour to coat a surface of each of the first oxide precursor and the second oxide precursor among the intermediate products with cobalt. After completion of the reaction, it was dried at 120° C. for 12 hours.

(d) The intermediate product was heated at 2° C. per minute to 700° C. while the 02 atmosphere was maintained in the furnace, and heat-treated at 700° C. for 12 hours to obtain a bimodal-type positive electrode active material in which a first lithium composite oxide as a small particle and a second lithium composite oxide as a large particle were mixed in a predetermined ratio.

(2) Example 2

A bimodal-type positive electrode active material was prepared in the same manner as in Example 1, except that in step (c), the reaction with the intermediate product was stirred at 400 rpm while the aqueous cobalt sulfate solution was added.

(3) Example 3

A bimodal-type positive electrode active material was prepared in the same manner as in Example 1, except that in step (c), a 5.7 wt % aqueous cobalt sulfate solution was used instead of the 7.0 wt % aqueous cobalt sulfate solution.

(4) Example 4

A bimodal-type positive electrode active material was prepared in the same manner as in Example 1, except that, in step (c), the aqueous cobalt sulfate solution was stirred for 90 minutes while adding instead of stirring for 1 hour while adding the aqueous cobalt sulfate solution.

(5) Example 5

A bimodal-type positive electrode active material was prepared in the same manner as in Example 1, except that, in step (b), the first oxide precursor, the second oxide precursor, LiOH (Li/(Ni+Co+Al) molar ratio=1.05), and $H_3BO_3$ (B/(Ni+Co+Al) molar ratio=0.015) were mixed and then heat-treated.

(6) Comparative Example 1

A bimodal-type positive electrode active material was prepared in the same manner as in Example 1, except that, in step (c), the aqueous cobalt sulfate solution was stirred for 30 minutes while adding instead of stirring for 1 hour while adding the aqueous cobalt sulfate solution.

(7) Comparative Example 2

A bimodal-type positive electrode active material was prepared in the same manner as in Example 1, except that in step (c), a 9.6 wt % aqueous cobalt sulfate solution was used instead of the 7.0 wt % aqueous cobalt sulfate solution.

(8) Reference Example

A bimodal-type positive electrode active material was prepared in the same manner as in Example 1, except that in step (b), the first oxide precursor, the second oxide precursor, LiOH (Li/(Ni+Co+Al) molar ratio=1.05), and $H_3BO_3$ (B/(Ni+Co+Al) molar ratio=0.015) were mixed and heat-treated and, in step (c), a 9.6 wt % aqueous cobalt sulfate solution was used instead of the 7.0 wt % aqueous cobalt sulfate solution.

Preparation Example 2. Manufacture of Lithium Secondary Battery 92 wt % of each positive electrode active material prepared according to Preparation Example 1, 4 wt % of artificial graphite, and 4 wt % of a PVDF binder were dispersed in 30 g of N-methyl-2 pyrrolidone (NMP) to prepare a positive electrode slurry. The positive electrode slurry was uniformly applied to an aluminum thin film having a thickness of 15 µm and vacuum dried at 135° C. to prepare a positive electrode for a lithium secondary battery.

Using lithium foil as a counter electrode to the positive electrode and a porous polyethylene membrane (Celgard 2300, thickness: 25 µm) as a separator, a coin cell was manufactured using an electrolyte in which $LiPF_6$ was present at a concentration of 1.15 M in a solvent in which ethylene carbonate and ethyl methyl carbonate were mixed in a volume ratio of 3:7.

Experimental Example 1. EP-EDS Analysis of Positive Electrode Active Material In order to measure the content of cobalt in the lithium composite oxide included in each positive electrode active material prepared according to Preparation Example 1, EP-EDS analysis was performed. In the EP-EDS analysis, after selecting the first lithium composite oxide (small particle) and the second lithium composite oxide (large particle) included in the positive electrode active material prepared according to Preparation Example 1, cumulative concentrations (at %) of the cobalt were analyzed to a certain depth to which an electron beam penetrated for each acceleration voltage while the acceleration voltage of the electron beam radiated to the surface of each of the selected first lithium composite oxide (small particle) and the selected second lithium composite oxide (large particle) was varied from 1 kV to 30 kV (1 kV, 3 kV, 5 kV, 7.5 kV, 10 kV, 12.5 kV, 15 kV, 20 kV, and 30 kV).

An absolute value of a slope of a concentration gradient of the cobalt measured in a region where the acceleration voltage of the electron beam radiated to the surface of the first lithium composite oxide (small particle) was in the range of 1 kV to 30 kV was defined as s1, and an absolute value of a slope of a concentration gradient of the cobalt measured in a region where the acceleration voltage of the electron beam radiated to the surface of the second lithium composite oxide (large particle) was in the range of 1 kV to 30 kV was defined as s2.

s1 and s2 representing the slope of the concentration gradient of the cobalt were calculated by taking a y-axis as an amount of change in the cobalt concentration ($\Delta$at %), and an x-axis as a change amount in the EDS acceleration voltage ($\Delta$kV %), and were calculated as the average values obtained by summing the slopes of each measurement region.

The EP-EDS analysis results are shown in Tables 1 and 2 below. In Tables 1 and 2 below, examples of s1 and s2 that satisfy Equations 1 to 3 defined herein, but do not satisfy Equation 4 ($1.0 \leq s2/s1 \leq 3.0$) are described as Reference Example.

bimodal-type positive electrode active material according to Examples 1 to 5 has the concentration gradient in which the concentration of the cobalt decreases from the surface portion toward the central portion, and in this case, the absolute value of the slope of the concentration gradient of the cobalt decreasing from the surface portion toward the central portion of the first lithium composite oxide is smaller than the absolute value of the slope of the concentration gradient of the cobalt decreasing from the surface portion toward the central portion of the second lithium composite oxide.

TABLE 1

| Classification | | Cumulative concentration of cobalt by acceleration voltage (at %) | | | | | | | | |
| | | 1 kV | 3 kV | 5 kV | 7.5 kV | 10 kV | 12.5 kV | 15 kV | 20 kV | 30 kV |
|---|---|---|---|---|---|---|---|---|---|---|
| Example 1 | Large particle | 38.5 | 28.31 | 21.71 | 16.89 | 14.05 | 12.91 | 10.98 | 10.41 | 9.38 |
| | Small particle | 23.51 | 20.99 | 17.16 | 15.37 | 13.45 | 12.31 | 10.54 | 9.51 | 8.05 |
| Example 2 | Large particle | 38.05 | 27.98 | 19.88 | 16.35 | 13.77 | 13.22 | 11.75 | 10.51 | 9.57 |
| | Small particle | 23.54 | 20.87 | 17.22 | 15.41 | 13.64 | 12.55 | 10.59 | 9.64 | 8.17 |
| Example 3 | Large particle | 46.6 | 34.46 | 25.53 | 19.42 | 15.29 | 14.23 | 11.98 | 10.69 | 9.78 |
| | Small particle | 32.05 | 27.16 | 22.15 | 18.99 | 16.98 | 14.32 | 11.51 | 9.16 | 7.32 |
| Example 4 | Large particle | 54.77 | 41.27 | 28.83 | 20.92 | 16.33 | 14.7 | 12.35 | 10.83 | 9.83 |
| | Small particle | 28.00 | 25.16 | 21.54 | 19.05 | 16.37 | 14.11 | 11.16 | 9.04 | 7.08 |
| Example 5 | Large particle | 49.8 | 38.77 | 29.34 | 22.81 | 18.77 | 15.5 | 13.03 | 11.5 | 9.58 |
| | Small particle | 29.06 | 24.87 | 21.64 | 18.55 | 15.76 | 13.00 | 11.04 | 8.84 | 7.51 |
| Comparative Example 1 | Large particle | 29.17 | 22.52 | 18.89 | 15.81 | 14.3 | 12.00 | 11.11 | 10.31 | 9.44 |
| | Small particle | 38.05 | 29.00 | 22.34 | 17.34 | 14.97 | 13.77 | 11.94 | 10.49 | 9.11 |
| Comparative Example 2 | Large particle | 32.05 | 27.16 | 22.15 | 18.99 | 16.98 | 14.32 | 11.64 | 9.87 | 8.11 |
| | Small particle | 38.05 | 27.98 | 21.45 | 17 | 15.67 | 13.54 | 11.99 | 10.64 | 9.17 |
| Reference Example | Large particle | 54.77 | 41.27 | 28.83 | 20.92 | 16.33 | 14.7 | 12.35 | 10.83 | 9.83 |
| | Small particle | 23.51 | 20.99 | 17.16 | 15.37 | 13.45 | 12.31 | 10.54 | 9.51 | 8.05 |

TABLE 2

| Classification | | Absolute value | s2/s1 |
|---|---|---|---|
| Example 1 | s2 | 1.61 | 2.10 |
| | s1 | 0.77 | |
| Example 2 | s2 | 1.58 | 2.06 |
| | s1 | 0.77 | |
| Example 3 | s2 | 2.03 | 1.66 |
| | s1 | 1.22 | |
| Example 4 | s2 | 2.49 | 2.51 |
| | s1 | 0.99 | |
| Example 5 | s2 | 2.15 | 2.04 |
| | s1 | 1.05 | |
| Comparative Example 1 | s2 | 1.06 | 0.68 |
| | s1 | 1.55 | |
| Comparative Example 2 | s2 | 1.20 | 0.77 |
| | s1 | 1.56 | |
| Reference Example | s2 | 2.49 | 3.23 |
| | s1 | 0.77 | |

Referring to the results of Tables 1 and 2, it is confirmed that the cobalt in each of the first lithium composite oxide and the second lithium composite oxide included in the On the other hand, in the case of the positive electrode active material according to Comparative Examples 1 and 2, it is confirmed that the concentration gradient in which the concentration of the cobalt decreases from the surface portion toward the center portion is formed, but the absolute value of the slope of the concentration gradient of the cobalt decreasing from the surface portion toward the central portion of the first lithium composite oxide is greater than the absolute value of the slope of the concentration gradient of the cobalt decreasing from the surface portion toward the central portion of the second lithium composite oxide.

(2) Cross-Sectional SEM Analysis of Positive Electrode Active Material

In order to measure the grain boundary density of each of the first lithium composite oxide (small particle) and the second lithium composite oxide (large particle) included in the positive electrode active material prepared according to Preparation Example 1, the degree of aggregation of the primary particles in the secondary particle identified from the cross-sectional SEM image was confirmed.

First, the first lithium composite oxide (small particle) and the second lithium composite oxide (large particle) included in the positive electrode active material prepared according to Preparation Example 1 were each selected, and then for each of the selected first lithium composite oxide (small particle) and the selected second lithium composite oxide (large particle), cross-sectional SEM images were taken using FE-SEM (Bruker Corporation).

Then, for a plurality of particles identified from the cross-sectional SEM image, the number of crystallites placed on a virtual straight line crossing to the center of each particle in a minor axis direction and the number of interfaces between the crystallites were substituted into Equation 5 below to calculate the grain boundary density.

Grain boundary density=(number of interfaces between primary particles placed on the virtual straight line/number of primary particles placed on the virtual straight line) [Equation 5]

Table 3 below shows the average value of the grain boundary density measured for the plurality of particles identified from the cross-sectional SEM image.

TABLE 3

| | Average value of grain boundary density | |
| --- | --- | --- |
| Classification | First lithium composite oxide (small particle) | Second lithium composite oxide(large particle) |
| Example 1 | 0.80 | 0.97 |
| Example 2 | 0.84 | 0.98 |
| Example 3 | 0.86 | 0.97 |
| Example 4 | 0.85 | 0.97 |
| Example 5 | 0.88 | 0.99 |
| Comparative Example 1 | 0.83 | 0.96 |
| Comparative Example 2 | 0.89 | 0.99 |
| Reference Example | 0.86 | 0.96 |

Referring to the results in Table 3, it can be confirmed that the average value of the grain boundary density of the first lithium composite oxide (small particle) in the positive electrode active material produced according to Production Example 1 is smaller than the average value of the grain boundary density of the second lithium composite oxide (large particle).

That is, a relatively small number of primary particles are present in the interior of the first lithium composite oxide having a low grain boundary density compared to the second lithium composite oxide, meaning that the grain boundary between primary particles is also present in a small amount compared to that of the second lithium composite oxide.

In addition, since the average values of the grain boundary densities of the first and second lithium composite oxides in the positive electrode active materials according to Examples 1 to 5, Comparative Example 1, Comparative Example 2, and Reference Example are almost the same, the differences between the cumulative concentrations of the cobalt for each acceleration voltage and the slopes of the concentration gradients of the cobalt measured in the regions where the acceleration voltages are from 1 kV to 30 kV as shown in Tables 1 and 2 can be expected not to be due to the difference in the grain boundary density shown in Table 3.

Experimental Example 2. Evaluation of Electrochemical Properties of Lithium Secondary Battery A charging and discharging experiment was carried out by applying a voltage range of 3.0 V to 4.25 V at 25° C. and a discharge rate of 0.2 C using an electrochemical analyzer (Toyo, Toscat-3100) for the lithium secondary battery (coin cell) manufactured in Preparation Example 2 to measure the charging and discharging capacity.

In addition, the same lithium secondary battery was charged/discharged 50 times under the condition of 1 C/1 C in a driving voltage range of 3.0 V to 4.25 V at 25° C., and then the ratio of the discharging capacity at the 50th cycle to the initial capacity (cycle capacity retention rate) was measured.

The measurement results are shown in Table 4 below.

TABLE 4

| Classification | Charging capacity (mAh/g) | Discharging capacity (mAh/g) | Charging/ discharging efficiency (%) | Retention@50 cy (%) |
| --- | --- | --- | --- | --- |
| Example 1 | 238.1 | 211.9 | 89.0 | 92.0 |
| Example 2 | 237.9 | 212.5 | 89.3 | 92.4 |
| Example 3 | 238.6 | 213.0 | 89.3 | 91.9 |
| Example 4 | 238.7 | 213.1 | 89.3 | 91.7 |
| Example 5 | 239.5 | 214.3 | 89.5 | 94.0 |
| Comparative Example 1 | 235.4 | 207.1 | 88.0 | 83.0 |
| Comparative Example 2 | 236.3 | 208.0 | 88.0 | 81.1 |
| Reference Example | 236.1 | 206.7 | 87.5 | 84.5 |

Referring to the results of Table 4, it can be confirmed that the charging and discharging efficiency and the lifetime efficiency of the lithium secondary battery using the positive electrode active material in which the absolute value of the slope of the concentration gradient of the cobalt decreasing from the surface portion of the second lithium composite oxide toward the central portion thereof is greater than the absolute value of the slope of the concentration gradient of the cobalt decreasing from the surface portion of the first lithium composite oxide toward the central portion thereof are improved.

Meanwhile, in the case of the lithium secondary battery using the positive electrode active material according to Reference Example, it can be confirmed that the charging and discharging efficiency was measured almost similarly to that of lithium secondary batteries using the positive electrode active materials according to Comparative Examples 1 and 2, but the lifetime efficiency was slightly improved. However, compared to the lithium secondary batteries using the positive electrode active materials according to Examples 1 to 5, it can be seen that the lifetime efficiency of the lithium secondary battery using the positive electrode active material according to Reference Example is rather low.

Experimental Example 3. Stability Evaluation of Positive Electrode Active Materials and Lithium Secondary Batteries

(1) Evaluation of Thermal Stability of Positive Electrode Active Material

To evaluate thermal stability of the positive electrode active material prepared according to Preparation Example 1, weight loss at a temperature increase rate of 10° C./min from 25° C. to 350° C. in an Ar atmosphere at atmospheric pressure using a thermogravimetric analyzer (TA Instruments, Q20) was measured. In this case, the starting temperature (on-set) at which the weight loss (thermal decomposition) peak appeared in each positive electrode active material is shown in Table 5 below.

TABLE 5

| Classification | On-set temp. (° C.) |
|---|---|
| Example 1 | 227.8 |
| Example 2 | 226.1 |
| Example 3 | 228.5 |
| Example 4 | 228.1 |
| Example 5 | 229.7 |
| Comparative Example 1 | 221.4 |
| Comparative Example 2 | 224.8 |
| Reference Example | 222.6 |

Referring to the results of Table 5, it was confirmed that the starting temperature (onset) at which the weight loss (thermal decomposition) peak appears in the positive electrode active materials according to Examples 1 to 5 was higher than that in the positive electrode active materials according to Comparative Examples 1 to 3. That is, it can be seen that thermal stability of the positive electrode active materials according to Examples 1 to 5 is superior to that of the positive electrode active materials according to Comparative Examples 1 to 2.

(2) Measurement of Gas Generation Amount in Lithium Secondary Batteries

After charging the lithium secondary battery manufactured according to Preparation Example 2 to 4.25 V at a constant current of 0.2 C, and storing the charged lithium secondary battery at 60° C. for 14 days, the volume change of the lithium secondary battery due to gas generation in the lithium secondary battery was measured. The volume change measurement results are shown in Table 6 below.

TABLE 6

| Classification | Gas generation amount ($\Delta cm^3$) |
|---|---|
| Example 1 | 0.40 |
| Example 2 | 0.41 |
| Example 3 | 0.39 |
| Example 4 | 0.37 |
| Example 5 | 0.39 |
| Comparative Example 1 | 0.60 |
| Comparative Example 2 | 0.62 |
| Reference Example | 0.61 |

Referring to the results in Table 7, it can be confirmed that the volume change of the lithium secondary battery using the positive electrode active material according to Examples 1 to 5 is smaller than that of the lithium secondary battery using the positive electrode active material according to Comparative Examples 1 to 3.

(3) Measurement of DC-IR Increase Rate Before/after Lifetime of Lithium Secondary Battery DC-IR after 1 cycle charging (SOC 100) under 1 C condition of the lithium secondary battery manufactured according to Preparation Example 3 and DC-IR in the charge state (SOC100) after 50 times of charging/discharging cycles under 1 C/1 C condition were measured, and the amount of increase in DC-IR is shown in Table 7 below.

TABLE 7

| Classification | DC-IR increase amount before/after lifetime (Ω) |
|---|---|
| Example 1 | 3.87 |
| Example 2 | 2.92 |
| Example 3 | 3.05 |
| Example 4 | 3.35 |
| Example 5 | 2.51 |
| Comparative Example 1 | 7.91 |
| Comparative Example 2 | 7.11 |
| Reference Example | 7.05 |

Referring to the results in Table 8, it can be confirmed that the increase in resistance after the lifetime of the lithium secondary batteries using the positive electrode active materials according to Examples 1 to 5 is smaller than the increase in resistance of the lithium secondary batteries using the positive electrode active materials according to Comparative Examples 1 and 2.

What is claimed is:

1. A bimodal-type positive electrode active material comprising a first lithium composite oxide as a small particle and a second lithium composite oxide as a large particle, wherein the first lithium composite oxide and the second lithium composite oxide include at least nickel and cobalt, and the cobalt in each of the first lithium composite oxide and the second lithium composite oxide has a concentration gradient that decreases from a surface portion toward a central portion, and when s1 represents an absolute value of a slope of the concentration gradient of the cobalt decreasing from the surface portion toward the central portion of the first lithium composite oxide and s2 represents an absolute value of a slope of the concentration gradient of the cobalt decreasing from the surface portion toward the central portion of the second lithium composite oxide, s1 and s2 satisfy the following Equation 1 to Equation 3:

$$s1 < s2, \qquad \text{[Equation 1]}$$

$$0.5 < s1 < 2.0, \text{ and} \qquad \text{[Equation 2]}$$

$$1.5 < s2 < 3.0. \qquad \text{[Equation 3]}$$

2. The positive electrode active material of claim 1, wherein s1 and s2 satisfy the following Equation 4, $$1.0 < s2/s1 \le 3.0. \qquad \text{[Equation 4]}$$

3. The positive electrode active material of claim 1, wherein, in energy profiling-energy dispersive X-ray spectroscopy (EP-EDS) analysis which measures a cumulative concentration of the cobalt from a surface of the first and second lithium composite oxides to a depth to which an electron beam penetrates using the electron beam radiated with an acceleration voltage increasing from 1 kV to 30 kV with respect to the surface of each of the first and second lithium composite oxides, a concentration (at %) of the cobalt in the second lithium composite oxide measured when the acceleration voltage is 1.0 kV is greater than a concentration (at %) of the cobalt in the first lithium composite oxide.

4. The positive electrode active material of claim 1, wherein, in energy profiling-energy dispersive X-ray spectroscopy (EP-EDS) analysis which measures a cumulative concentration of the cobalt from a surface of the first and second lithium composite oxides to a depth to which an electron beam penetrates using the electron beam radiated with an acceleration voltage increasing from 1 kV to 30 kV with respect to the surface of each of the first and second lithium composite oxides, a concentration (at %) of the cobalt in the second lithium composite oxide measured when the acceleration voltage is 30.0 kV is greater than a concentration (at %) of the cobalt in the first lithium composite oxide.

5. The positive electrode active material of claim 1, wherein an average particle diameter (D50) of the first lithium composite oxide is 7 μm or less.

6. The positive electrode active material of claim 1, wherein an average particle diameter (D50) of the second lithium composite oxide is greater than 7 μm and 30 μm or less.

7. The positive electrode active material of claim 1, wherein:

the first lithium composite oxide is a composite particle comprising at least one primary particle, which is represented by the following Chemical Formula 1:

$$Li_wNi_{1-(x+y+z)}Co_xM1_yM2_zO_2 \qquad \text{[Chemical Formula 1]}$$

where M1 is at least one selected from Mn and Al,

M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W, and Cu, M1 and M2 are different from each other, $0.5 \le w \le 1.5$, $0 < x \le 0.50$, $0 \le y \le 0.20$, and $0 \le z \le 0.20$.

8. The positive electrode active material of claim 7, wherein:

the first lithium composite oxide is a core-shell particle including a coating layer covering at least a portion of a surface of the at least one primary particle and a surface of the composite particle; and the coating layer comprises a metal oxide represented by the following Chemical Formula 2, $$Li_aM3_bO_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \le a \le 10$, $0 \le b \le 8$, and $2 \le c \le 13$, provided that a and b are not simultaneously 0.

9. The positive electrode active material of claim 1, wherein:

the second lithium composite oxide is a composite particle comprising at least one primary particle, which is represented by the following Chemical Formula 1:

$$Li_wNi_{1-(x+y+z)}Co_xM1_yM2_zO_2 \qquad \text{[Chemical Formula 1]}$$

where M1 is at least one selected from Mn and Al,

M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W, and Cu, M1 and M2 are different from each other, $0.5 \le w \le 1.5$, $0 < x \le 0.50$, $0 \le y \le 0.20$, and $0 \le z \le 0.20$.

10. The positive electrode active material of claim 9, wherein:

the second lithium composite oxide is a core-shell particle including a coating layer covering at least a portion of a surface of the at least one primary particle and a surface of the composite particle; and the coating layer comprises a metal oxide represented by the following Chemical Formula 2, $$Li_aM3_bO_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \le a \le 10$, $0 \le b \le 8$, and $2 \le c \le 13$, provided that a and b are not simultaneously 0.

11. The positive electrode active material of claim 1, wherein a weight ratio of the first lithium composite oxide and the second lithium composite oxide in the positive electrode active material is in a range of 5:95 to 50:50.

12. A positive electrode comprising the positive electrode active material of claim 1.

13. A lithium secondary battery using the positive electrode of claim 12.

* * * * *